Aug. 7, 1934.  S. E. SLOCUM  1,969,046
VIBRATION DAMPENER AND ISOLATOR
Filed Nov. 19, 1930
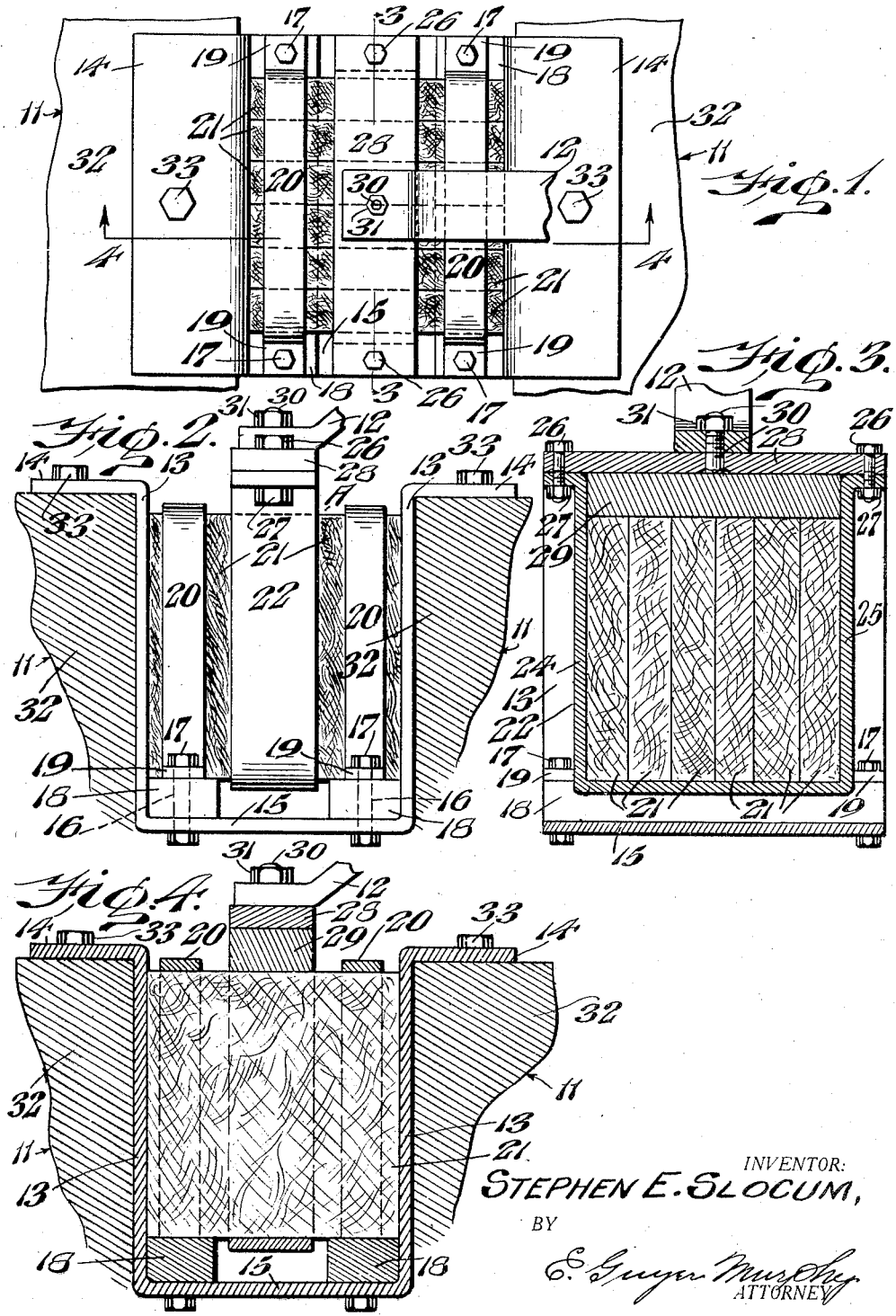
INVENTOR:
STEPHEN E. SLOCUM,
BY
E. Guyon Murphy
ATTORNEY Patented Aug. 7, 1934

1,969,046

UNITED STATES PATENT OFFICE 1,969,046

VIBRATION DAMPENER AND ISOLATOR

Stephen E. Slocum, Ardmore, Pa.

Application November 19, 1930, Serial No. 496,611

3 Claims. (Cl. 248—16)

This invention in general relates to means for dampening and isolating vibrations in oscillating bodies, machines, buildings and structures, having for its principal object the provision of improved means of the kind described and will prevent or eliminate in large measure the transmission of vibrations from an oscillating body, such as a machine in operation to adjacent bodies or structures.

Another object of the invention is to provide a vibration dampener or isolator of a novel type wherein the results achieved are accomplished by supporting or connecting the machine or load to the foundation by means of vibration absorbing material.

A further object of the invention is to provide vibration dampening means of a comparatively simple and inexpensive construction, but of the highest efficiency in absorbing vibrations.

A still further object of the invention is to support a machine or a mechanically oscillating body to a base so that the principal strain developed will be shear.

Other objects and advantages of the invention will appear hereinafter when taken in connection with the accompanying drawing, in which:—

Figure 1 is a top plan view of an embodiment of my invention operatively supported on a foundation;

Figure 2 is a side elevational view of the invention, the foundation material being illustrated in fragmentary cross section;

Figure 3 is a vertical sectional view taken on line 3—3 of Figure 1 looking in the direction of the arrows, and Figure 4 is a longitudinal sectional view taken on line 4—4, Figure 1, looking in the direction of the arrows.

Before entering into a detailed description of the parts entering into the preferred form of the invention, it is desired to point out that at the present time the checking or elimination of vibrations and noise is being given careful attention in engineering fields, numerous anti-vibrations and noise eliminating devices having been placed on the market with a view to accomplishing this result.

Heretofore machines having vibrating parts have been supported on floors, foundations, etc. by placing the uprights or supporting elements of the machine in chairs or sockets lined with felt or similar vibration-dampening means. These devices have substantially lessened vibration, but I have found when vibration-creating bodies or machines are supported in shear on a foundation, the tendency of the entire mechanical system including the oscillating body to vibrate can be decreased to an extent not hitherto possible by the methods and means employed.

I have described in the Proceedings of the American Society of Civil Engineers for the year 1929, pages 2109–2129 inclusive, various tests and experiments conducted by me with a view of determining the most effective means for eliminating vibration and consequently noises. As a result of these tests and experiments it was discovered that supporting a vibrating body such as a machine in operation in such a manner that the principal strain in the supporting material would be shear, was the most efficient method available.

Among the features that should enter into a vibration dampening or isolating device or system of the highest efficiency, the following prerequisites may be assumed as a consequence of the tests made by me.

1. The principal strain in the vibration-absorbing medium should be shear;
2. With a view to convenience in manufacture and practical application, the vibration-absorbing medium should be produced in units of convenient size with a view to a quick determination of unit load and deformation;
3. Anchorage of the machine should be obtained without impairing or interfering with the vibration-absorbing properties of the dampening means;
4. The vibration-absorbing or isolation units should preferably be as compact as possible with a view to occupying as little space for installation as possible, and consequently not to materially raise the elevation of the bed plate of the machine.
5. The vibration-absorbing units should be designed with a view to their ready manufacture in stock sizes for the convenience of the building trades and machine manufacturers, each size having certain definite range of unit load and unit deformation.
6. The vibration-absorbing units should be so designed and constructed in various sizes that their natural frequency of vibration may be definitely constant and readily predetermined by tests, so as to avoid the possibility of synchronism with the impressed frequency of the body or machine they support.

In accordance with the present invention, I have provided laminations or sections of vibration-dampening material on which the load is supported in shear, this being one of the principal features of the present invention, although the principle of load suspension in flexure may also be introduced to a variable extent. Heretofore as pointed out above, the general method employed for load suspension of machinery has been compression in conjunction with suitable vibration dampening material. In this latter conventional method, it has been determined by tests, that oscillations from the machine or device supported are communicated with much greater facility to the foundation or supporting medium than when, as in my device, the load is supported in shear.

By a general inspection of the figures, it will be at once apparent that the load is not placed or carried directly over the rigid supports but between them, thereby developing a strain or resistance of pure vertical shear in the vibration-absorbing medium. It will be further noted that by altering or widening the span of the vibration-absorbing material, or in other words, separating to a greater extent the points of support of the shock absorbing medium on the foundation, a component of flexure may be introduced to any desired extent as supplementary to the shearing component.

For the purpose of illustrating my invention, I have shown in the accompanying drawing one form thereof which is at present preferred by me, since the same has been found in practice to give satisfactory and reliable results, although it is to be understood that the various instrumentalities of which my invention consists can be variously arranged and organized, and that my invention is not limited to the precise arrangement and organization of the instrumentalities as herein shown and described.

In the drawing wherein similar characters of reference indicate corresponding parts in the several views of the preferred form of the invention, 11 designates any suitable foundation material such as concrete cement to which my vibration dampener or isolator is secured.

My vibration dampener A, whereon a foot 12 of a machine or other body (not shown) is secured as hereinafter described, comprises a metal stirrup or support 13 which may be U-shaped, as viewed in Figures 2 and 4, and provided with flanges 14—14 which directly engage or rest on the concrete or foundational material 11. The lower portion or base 15 of the stirrup 13 has secured by bolts and nuts 16, 17 thereto, blocks or strips of material 18 of any suitable material, whereon the flanges 19 of U-shaped straps 20 are fastened by the bolts and nuts 16, 17 mentioned above, the bottom portion 15, block 18 and flanges 19 being suitably apertured with registering holes for the reception of the stems of the bolts 16.

The U-shaped straps 20 clampingly confine one or a plurality of registering laminations or blocks of any suitable material such as glass polishing felt, rubber, factis, etc. 21, or other vibration absorbing substance arranged in vertical alignment. The laminations of vibration-absorbing material 21 are clampingly engaged at their midpoint by a U-shaped member or strap 22 partly encircling the centre of the periphery of the vibration-absorbing material 21 as a unit.

Secured to flanges 23 on either arm 24, 25 of the U-shaped member 22 by bolts and nuts 26, 27 is a load-distributing plate 28 under which a section or filler block 29 of the vibration-absorbing material is arranged.

The filler block 29 is clamped between the arms 24, 25 of the U-shaped member 22 and rests directly on the upper face of the vibration-absorbing material 21. Fastened to the plate 28 by the bolt and nut 30, 31 is the foot 12, it being observed that the foot 12 and plate 28 respectively, are suitably apertured to permit the bolt 30 to pass therethrough, the head of the bolt 30 being engaged beneath the undersurface of the load-distributing plate 28 while the nut 31 is clampingly engaged against the upper surface of the foot 12.

It is desired to call attention to the fact that the present device accomplishes its functions by supporting the load or vibrating body in such manner that the principal strain developed in the vibration-absorbing material is shear, but it may also be noted that by increasing the distance between the supports 18, the principle of support in flexure may be introduced; in other words, the tendency of the load distributing plate 28 to flex or bend the vibration-absorbing unit 21 obviously become greater as the end supports, in this instance the blocks 18, are separated to a greater extent. The vibration-absorbing material employed in the present instance is so called "rubbing felt", a material used in polishing glass, but of course, any suitable substance such as rubber, factis, mentioned above, having desirable characteristics for absorbing vibrations, may be employed.

In applying my invention to building, it will be observed that the device A, as clearly shown in the illustrations is positioned preferably below the level of the floor, which in the present instance may be assumed to be the top 32 of the foundation material 11, by any suitable means such as the bolts or lag screws 33 embedded in the foundation material 11. This is an important feature since it does not necessitate the raising of the machine or vibrating body above the floor level and the consequent utilization of a space otherwise available. In addition to this the device being located below the floor level or between the joists thereof, noise is substantially lessened. It is also to be noted that in eliminating vibration and noises, arising therefrom, not only is the life of the building conserved but the material comfort of all in the said building is greatly enhanced.

It will now be observed that when the beam, block, or laminations, etc. of vibration-absorbing or damping material is comparatively short, as preferably illustrated in the drawing, the principal strain developed therein under load will be shear; and when the vibration-absorbing medium is lengthened to a greater or less extent, a strain of flexure will be introduced to a corresponding greater or less extent in combination with the shearing strain.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. A device of the kind described comprising a foundation-engaging U-shaped member, a plurality of laminations of vibration-absorbing material supported in vertical alignment on a pair of means fastened at two equi-distant points on said U-shaped member, a second U-shaped member supported on said laminations of vibration-absorbing material, and load distributing means secured on said second U-shaped member whereby the principal strain developed in said vibration absorbing material is vertical shear.

2. A vibration dampening means for insulating foundations and the like from vibrations set up by machine supported on said foundations comprising in combination a laminated, prismatic, resilient core, a U-shaped metal stirrup, clamps securing said core to said stirrup, and means securing said stirrup to a foundation, and a load-supporting member engaged with said core, said load-supporting member being disposed about an area of said core equi-distant from opposite sides of said U-shaped metal stirrup.

3. An insulating device for minimizing the transmission of machine vibrations to a foundation on which a machine is operatively installed, said device comprising a vibration-dampening medium, foundation engaging means, load supporting means directly mounted on said vibration dampening medium, and other means securing the said vibration dampening medium to the foundation engaging means, said other means including a plurality of straps directly engaging the medium and a plurality of blocks fastened to the straps and to the foundation-engaging means, all of said means being so disposed and coordinated that the principal stress developed in the medium will be that of shear, said vibration dampening medium being composed of a plurality of vertical laminations of resilient material, whereby the natural frequency of the dampening medium is controlled by altering the number of laminations employed.

STEPHEN E. SLOCUM.